June 9, 1964

H. E. JAKES ETAL 3,135,972

SEGMENTED LITTER

Filed April 30, 1963

HAROLD E. JAKES
DON M. DE MERCE
INVENTORS

Huebner & Worrel
ATTORNEYS

United States Patent Office 3,135,972
Patented June 9, 1964

3,135,972
SEGMENTED LITTER
Harold E. Jakes, Exeter, and Don M. De Merce, Lemon Cove, Calif., assignors to Rescue Research & Development Co., a corporation of California
Filed Apr. 30, 1963, Ser. No. 276,915
12 Claims. (Cl. 5—82)

This invention relates to a segmented litter having separable portions adapted for releasable rigid connection in an assembled condition to form an integral unit. The invention particularly relates to such a litter wherein each of the segments are longitudinally tapered and relatively proportioned in graduated sizes to permit a reception of a smaller segment within a larger segment so as to permit assembly in a nested relation to form a portable compact package.

Previously available litters have served adequately in urban areas wherein the problem of transporting the litter to an injured party is of no great concern. However, when attempting to reach injured persons in mountainous and/or heavily forested regions, or other locations of difficult access, it usually is necessary to traverse narrow, steep trails presenting numerous natural obstacles to movement. Accordingly, a rigid, bulky structure is not suited for use in such an environment, particularly where the litter must necessarily be carried an extended distance.

During rescue operations in mountainous areas, additional injuries have been sustained by persons while being transported on a litter. Such injuries occur in areas in which rocks or other objects can be dislodged from a superior position and strike the injured person. Accordingly, it is desirable to incorporate a protective device in litters used for such rescue.

Helicopters are widely used in contemporary rescue operations, particularly in air/sea rescue of persons suffering an injury or being marooned in open water a great distance from shore. During such air/sea rescue by helicopter, a need exists for a lightweight, compact litter which is durable, strong, and sufficiently rugged to permit dropping from the aircraft, and also buoyant while in the water.

In rescue operations in areas which are not readily accessible, a need also exists for a lightweight container capable of portage by a person of average strength and suitable to transport various first-aid supplies and the like. As will become apparent, optimum design of such a litter permits the structure to serve as a container for transport either in an assembled or disassembled condition. Previously available litters have been found unsuited for the purpose of such transport.

Accordingly, it is an object of the present invention to provide a segmented litter formed of individual segments and including means releasably connecting the segments to form an integral unit.

Another object of the invention is to provide such a litter wherein the individual segments are so designed and proportioned as to permit arrangement thereof in a disassembled condition to form a portable container.

Another object of the invention is to provide a litter capable of being used as a ground traversing vehicle.

Another object is to provide a lightweight, rugged litter of buoyant construction.

A further object is to provide a lightweight segmented litter constructed of individual segments capable of assembly by interfitting means into an integral unit of sufficient rigidity to support a person thereon.

A still further object is to provide in a segmented litter means to shield a person resting on the litter during traversal of areas potentially hazardous to such a person.

These, together with other objects, will become more fully apparent upon reference to the following description and accompanying drawing.

Figure 1:
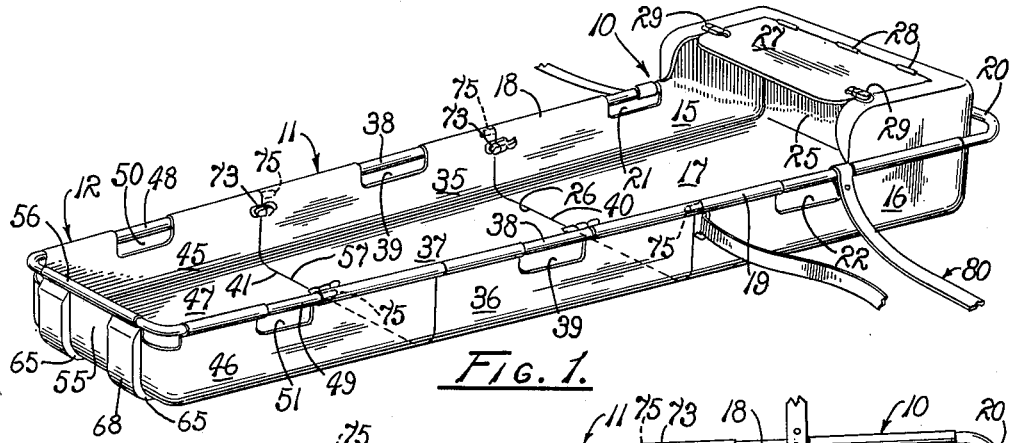
FIG. 1 is a perspective view of a litter incorporating the principles of the present invention and shown in an assembled condition suitable to support a person thereon and capable of being transported either by manual lifting or by ground traversing movement.
Figure 2:
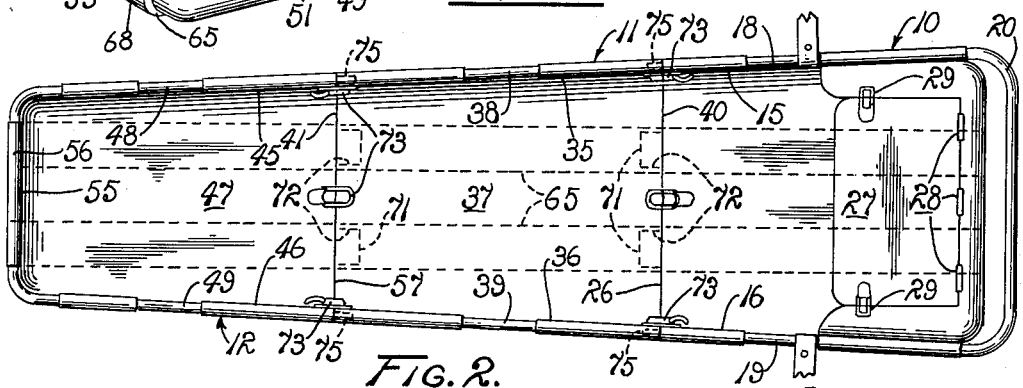
FIG. 2 is a top plan view of the litter of FIG. 1.
Figure 3:
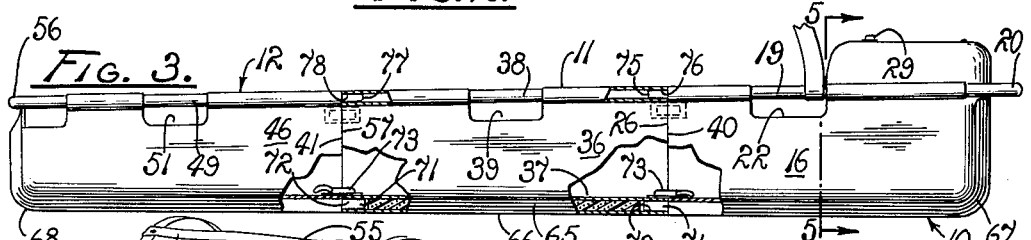
FIG. 3 is a view in side elevation of the litter of FIG. 1, certain parts being broken away for illustrative convenience.

Referring in greater particularity to the drawings, a litter embodying the principles of the present invention is shown in an assembled condition in FIGS. 1, 2 and 3. The litter generally includes a separate prow segment 10, an intermediate segment 11, and a stern segment 12. Means, subsequently to be described, are provided to maintain the segments in a releasably, rigidly assembled condition, as shown in the aforementioned figures. The litter can be constructed of any suitable, preferably lightweight, material of sufficient rigidity to support a person reclining on the litter in a supine position, the material also having a certain limited degree of flexibility to permit assembly of the interfitting means to be described below. Examples of suitable materials are commercially available sheet steel and sheets of cured synthetic resins, such as epoxy resins reinforced with glass fibers, such resinous materials being sold under the trademark Fiberglas. Other lightweight materials, such as sheet aluminum and cured plastic materials having physical characteristics similar to polyurethane and the like, can be satisfactorily employed in fabricating the litter of the present invention.

The prow segment 10 includes a pair of laterally opposed walls 15 and 16 integrally upwardly extended from a floor 17, which is substantially horizontal when the litter is in a position to support a person thereon. The walls terminate in respective upper longitudinally extended edges in the form of side rails 18 and 19. Ideally, the side rails 18 and 19 are of a transverse dimension greater than the walls to enhance the longitudinal rigidity of the assembled litter unit. In a commercial form, the side rails 18 and 19 are formed of aluminum tubing and extend forwardly of the segment 10 where they are integrally joined to form a manually engageable forward handle 20. The forward handle so formed adds greatly to the structural rigidity of the assembled litter, and can also be used for lifting and/or pulling of the litter. The side walls 15 and 16 are also provided with respective openings 21 and 22 to serve as hand holds in manually lifting the litter. With the openings 21 and 22 located as illustrated, portions of the side rails 18 and 19 are available for manual grasping and serve as handles in transporting the litter.

The prow segment 10 also includes a forward wall 25 integrally upwardly extended from the floor 17. The floor 17 extends longitudinally rearwardly from the wall 25 and terminates in a transverse edge 26 adapted to abut the intermediate segment 11. The forward wall 25 is also extended rearwardly at its uppermost limit in elevationally spaced overlying relationship to a portion of the floor 17 and joined integrally with the forward portions of the side walls 15 and 16. This rearward extension thereby forms a shielding hood 27. The hood 27 is elevationally spaced above the floor 17 a sufficient distance to permit a person lying on the litter to rest his head beneath the hood in the area of protection afforded thereby. To facilitate the assumption of a reclining position by such a person, a portion of the hood is preferably adapted for opening outwardly of the litter, as by a pair of hinges 28. The hinged portion is releasably maintained in a closed, protective position by a pair of laterally opposed retaining clips 29, pivotally secured to the prow portion 10.

As can be seen more clearly in FIG. 2, the side walls 15 and 16 of the prow segment 10 taper longitudinally from the forward wall 25 to the transverse abutment edge 26. The reason for such longitudinal taper is to permit reception of the intermediate segment 11 and the stern segment 12 within the prow segment in a nested relationship.

The intermediate segment 11 is constructed in a manner similar to the prow segment to the extent of having a pair of laterally opposed walls 35 and 36 integrally upwardly extended from a floor 37. The walls terminate in respective upper longitudinally extended edges in the form of side rails 38 and 39, of a configuration substantially identical to the side rails 18 and 19. The floor extends from a forward transverse edge 40, adapted to abut the edge 26 of the prow segment, to a longitudinally spaced rearward transverse edge 41, adapted to abut the stern segment 12. As in the prow segment 10, the walls 38 and 39 and the floor 37 are tapered longitudinally from the forward transverse edge 40 to the rearward edge 41. The longitudinal taper is of a degree and the resultant wall convergence substantially identical to that of the prow segment so that in an assembled condition the respective walls of the segments are in an aligned condition. The relative proportions of the segments 10 and 11 are such to permit reception of the segment 11 within the open ended compartment formed by the side walls 15 and 16, the floor 17 in conjunction with the forward wall 25 and the hood 27. To facilitate such reception, the intermediate segment 11 is inverted transversely about its longitudinal axis and moved longitudinally relative to the prow segment so that the forward transverse edge 40 is adjacent to the forward wall 25.

The stern segment 12 is formed in a manner substantially identical to that of the prow and intermediate segments, and includes laterally opposed walls 45 and 46 integrally upwardly extended from a floor 47. The walls terminate in respective upper edges in the form of side rails 48 and 49. The walls 45 and 46 are provided with respective openings 50 and 51 adjacent to the side rails 48 and 49, the exposed portions of which serve as handles in carrying the litter in a conventional manner. A stern wall 55 is integrally upwardly extended from the rearward limit of the floor 47 thereby forming an open compartment in conjunction with the side walls of the assembled unit and the forward wall 25. The stern wall 55 terminates in an upper edge 56 which is of a transverse dimension greater than the wall 55. The upper edge 56 is formed as an extension of the side rails 48 and 49 which are integrally joined, thereby further enhancing the rigidity of the assembled integral unit. Preferably, the side rails of each of the individual segments as well as the upper edge 56 are fabricated in the form of a tubular bead to provide maximum rigidity at a minimum net weight. As can also be seen in FIG. 2, the stern segment tapers from a forward transverse edge 57 toward the stern wall 55. The degree of taper is substantially identical to that of the prow and intermediate segments, and the size of the stern segment is proportionately smaller to permit reception thereof within the intermediate segment in a nested relationship.

The respective floor of each of the segments is provided with a pair of longitudinally extended, laterally opposed runners 65. As can be seen in FIG. 3, each of the runners is extended substantially throughout the longitudinal limits of the litter and each runner affords a respective downwardly facing ground engaging surface 66. The runners are also extended upwardly about each of the opposite longitudinal ends and are substantially integral with the forward and stern walls 25 and 55 to provide respective forward and rearward ends 67 and 68 for each of the runners. To provide maximum rigidity and a minimum weight, the runners of each segment are of tubular form having closed ends to form buoyancy chambers 69. Such chambers are filled with a closed cell buoyant material 70, such as foamed polyurethane. The proportions of the chambers 69 relative to the density and total displacement of the assembled unit are such so as to render the litter buoyant in water, regardless of its orientation.

The individual runners of each segment are adapted to abut respective runners of an adjacent segment in matched pair relationship, as for example, each of the runners of the prow segment 10 abuts a respective one of the runners of the intermediate segment 11, thereby forming two, laterally opposed matched pairs. One runner of each of such matched pairs is provided with a longitudinally extended pilot portion in the form of a pin 71, and the adjacent end of the other runner of the matched pair is provided with a socket 72, suitably positioned and proportioned to receive its mating pin 71 in snugly fitted, frictionally engaging relationship. In the form of the invention illustrated, the abutting ends of each of the runners of the prow segment 10 are each provided with a pilot pin 71, and the adjacent ends of each of the runners of the intermediate segment 11 are each provided with a complementary socket 72. In like manner, the abutting ends of the runners at the juncture of the stern and intermediate portions are provided with cooperating pilot pins 71 and complementary receiving sockets 72. When the pilot portions 71 are received within the sockets 72 in interfitting, frictionally engaging relationship, they constitute interfitting means adapted to maintain the segments in a releasable, rigid condition to form an assembled integral unit. While it is contemplated that the pilot portions 71 are to be tightly received within complementarily sized sockets 72, retaining means, such as quick-release clamps 73 of the over-center type, are provided in a commercial form of the litter dependably to maintain assembly of the unit. The clamps 73 are rigidly secured to the individual segments and readily permit both assembly and disassembly of the litter.

Further to enhance the rigidity of the unit and to maintain the individual segments in an assembled relation, the side rails 18 and 19 of the prow segment 10 are each provided with pilot portions 75 extended a predetermined distance toward the respective side rails of the adjacent segment 11. The pilot portions 75 are dimensioned to be received in frictionally engaging relation with complementarly formed sockets 76 afforded by the tubular side rails 38 and 39 of the intermediate segment 11. In a substantially identical relationship, the side rails 48 and 49 of the stern segment 12 are each provided with pilot portions 77 adapted to be received in sockets 78 provided in the abutting ends of the side rails 38 and 39.

Figure 4:
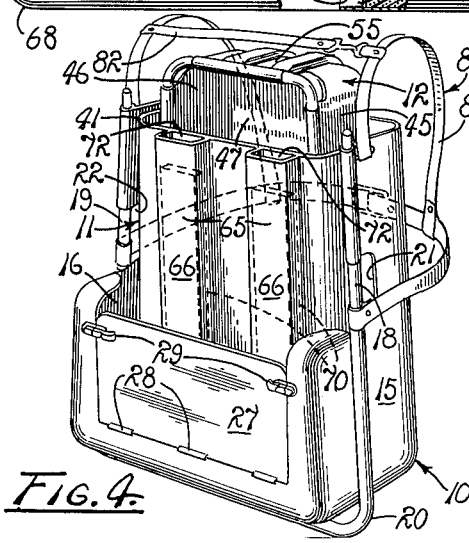
FIG. 4 is a perspective view showing the litter in a disassembled condition, the individual segments being in a nested relation suitable for portage.
Figure 5:
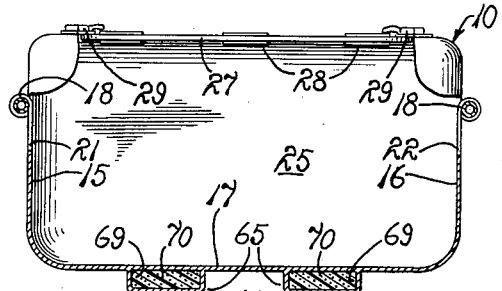
FIG. 5 is a view in end elevation of the prow segment of the litter of FIG. 1.

Suitable harness, such as is generally indicated at 80, is releasably secured to the prow segment to facilitate portage of the unit in a manner similar to a conventional back-pack type of knapsack in the nested association shown in FIG. 4. The harness includes a pair of laterally opposed shoulder straps 81 and a pair of elongated retaining straps 82 adapted to encircle the wearer. The straps 82 should also be of sufficient length to serve as tension members when propelling the assembled litter as a sled or similar ground traversing vehicle. Other forms of harness suitable to adapt the litter to serve as a back-pack when disassembled will readily occur to those skilled in the art.

*Operation*

The operation of the described embodiment of the subject invention is believed to be readily apparent and is briefly summarized at this point. Assuming that the segments 10, 11, and 12 are physically separated as individual component parts, they may readily be assembled by insertion of the pilot portions 71 of the runners 65 within their respective cooperating sockets 72. In like manner, the pilot portions 75 of the side rails 18 and 19 are inserted within their respective sockets 76 provided in side rails 38 and 39. To facilitate such assembly, the forward ends of the side walls 35 and 36 are deflected inwardly a slight distance to permit entry of the pilot portions 75 adjacent to the transverse edge 40 into the cooperating sockets 76 of the intermediate segment 11. Alternatively, the sockets 76 can be provided with an elliptical or oval form when viewed in cross-section with the major axis substantially parallel to the floor 17. However, since rigidity of the assembled unit is a desired characteristic, it is preferred to have the pilot portions 75 in tight frictional engagement with the sockets 76. Accordingly, the preferred method of assembly involves slight inward deflection of the forward portions of the side walls 35 and 36.

In a similar manner, the stern segment 12 is assembled with the intermediate segment 11. Further to insure maintenance of the assembled condition, the retaining clamps 73 are then fastened by appropriate movement to an over-center, locked position. Other suitable forms of retaining clamps will readily occur to those skilled in such art. In an assembled condition, the integral litter is then suitable for transporting a person thereon either by carrying in the manner of a conventional litter or by propelling the unit as a sled on the surfaces 66 afforded by the runners 65. In the latter form of motivation, the elongated straps 82 conveniently serve as tow lines in pulling the unit.

To carry the unit in a disassembled form, the securing pins, if provided, are first removed to permit longitudinal separation of the prow, intermediate and stern segments 10, 11 and 12. The intermediate segment 11 is then inverted transversely about its longitudinal axis and placed in a nesting, overlying relationship to the stern segment 12. The nested segments 11 and 12 being of a smaller size than the prow segment 10 are then received within the open ended compartment formed by the side walls 15 and 16 in conjunction with the end wall 25 and hood 27. This nested relationship of the segments is illustrated in FIG. 4, wherein the harness 80 adapts the litter for portage in a manner analogous to a conventional backpack type of knapsack.

In the disassembled nested relationship shown in FIG. 4, the stern segment can be longitudinally withdrawn in the manner of a conventional drawer. Since the lateral dimensions of the stern segment 12 at its forward edge 57 are slightly in excess of the inside lateral dimensions of the segment 11 at its rearward edge 41, the physical interference between the two segments prevents inadvertent complete withdrawal of the segment 12, when serving as a drawer. When so utilized, the internal compartment afforded by the segment 12 can conveniently be used as a storage area for first-aid supplies, and the like. Accordingly, the unit when in a disassembled nested relationship serves as a lightweight back-pack, thereby further enhancing the overall utility of the invention.

In assembled form, the litter can also be utilized as a transporting vehicle, similar to the conventional sled. When utilized in its primary function, that of a litter, the lightweight but rigid unit is ideally suited for areas not readily accessible by conventional transporting vehicles, such as automobiles, ambulances, and the like. In addition, the hood 27 affords protection for the head of the injured person being carried on the litter. This protection is particularly desirable in rescue operations performed by helicopter, since the injured person is otherwise subjected to severe windblast from the rotor of the helicopter.

The litter is also excellently suited to air/sea rescue operations. By reason of the buoyancy chambers 69 provided in the runners 65, the litter is dropped from the conveying aircraft either as individual segments which float and permit subsequent assembly in the water, or dropped as an assembled unit ready for use. The buoyant characteristic does not detract from its rugged dependability and adapts the litter for use in all normally encountered environments of rescue work.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A segmented litter comprising separate prow, stern, and intermediate segments; interfitting means carried by each of the individual segments to provide a releasable, rigid connection between respectively adjacent segments when joined as an assembled integral unit, each of the segments having a floor and laterally opposed side walls upwardly integrally extended from its respective floor, and laterally spaced, longitudinally extended ground engaging runners integral with the floor and projecting downwardly therefrom to adapt the unit for ground traversing movement.

2. The litter of claim 1 wherein said interfitting means are incorporated into the runners of adjacent segments, the runners of one segment having projecting portions extending from the runners and the runners of a respectively adjacent segment being formed with receiving cavities of a configuration complementary to said projections.

3. A segmented litter comprising separate prow, stern, and intermediate segments; interfitting means carried by each of the individual segments to provide a releasable, rigid connection between respectively adjacent segments thereby to permit assembly into an integral unit, each of the segments having a floor and laterally opposed side wall upwardly integrally extended from its respective floor; said prow segment having a forward wall integrally upwardly extended from the floor and joining the side walls, and a shielding hood extended from said wall toward said stern segment to provide a closed forward end for said prow segment, the relative proportions of said segments being such to permit reception of said intermediate and stern segments within said prow segment in a nested relationship with the intermediate segment being inverted transversely about its longitudinal axis; and harness means secured to the prow segment to permit portage of the prow segment in a position with the longitudinal axis thereof substantially vertically oriented and said forward wall facing downwardly.

4. A segmented litter comprising a plurality of individual segments; interfitting means carried by each of the individual segments to provide a releasable, rigid connection between respectively adjacent segments thereby to form an assembled integral unit, each of the segments having a floor and laterally opposed side walls upwardly integrally extended from its respective floor, laterally spaced, longitudinally extended ground engaging runners carried by the floor and projecting downwardly therefrom to adapt the unit for ground traversing movement, one of said segments having a forward wall integrally upwardly extended from the floor and joining the side walls to adapt said one segment as a prow segment, a shielding hood extended rearwardly from said forward wall, and longitudinally spaced fore and aft pairs of laterally opposed handle means carried by the side walls of the unit.

5. The litter of claim 4 wherein said interfitting means are incorporated into the runners of adjacent segments, the runners of one segment having projecting portions extending from the runners and the runners of a respectively adjacent segment being formed with receiving cavities of a configuration complementary to said projections.

6. The litter of claim 4 wherein said runners are formed with internal, closed buoyancy chambers of a size relative to the density and displacement of the litter to render it buoyant as an assembled unit.

7. A longitudinally extended segmented litter comprising individual prow, stern and intermediate segments, each segment having a pair of laterally opposed side walls integrally upwardly extended from a respective floor, the side walls terminating in respective upper edges of a transverse dimension greater than the walls thereby affording laterally opposed reinforcing side rails extended substantially the length of the litter, the prow segment having a forward end wall integrally upwardly extended from the floor and joining the respective side walls of the segment, the wall being extended toward the stern segment in elevationally spaced overlying relationship to the floor to provide a shielding hood; a pair of laterally opposed runners integrally downwardly extended from the floor on each segment, the individual runners of each segment adapted to abut a respective one of the runners of an adjacent segment in matched pair relationship, one of the runners in each of said matched pairs having a longitudinally projecting pilot portion extended from its respective abutting end, and the adjacent end of the other runner of each matched pair being provided with a socket complementarily formed to receive said pilot portion; the litter being longitudinally tapered from the prow segment toward the stern segment, the relative proportions of said segments being such to permit reception of said intermediate and stern segments within the prow segment in a nested relationship with the intermediate segment being inverted transversely about its longitudinal axis, and harness means secured to the prow segment to permit portage of the litter in such a nested relationship with the prow segment in a position with its longitudinal axis substantially vertically oriented and said forward wall facing downwardly.

8. The litter of claim 7 wherein said reinforcing side rails are in the form of cylindrical bars, and wherein interfitting means are provided to maintain respective abutting side rails of each segment in rigid, releasably connected condition.

9. The litter of claim 8 wherein the individual side rails of each segment are adapted to abut a respective one of the side rails of an adjacent segment in matched pair relationship, one of the side rails in each of said matched pairs having a longitudinally projecting pilot pin extended from its abutting end, and the adjacent end of the other side rail of each matched pair being provided with a socket complementarily formed to receive said pilot pin, and wherein the side walls of the unit are provided with longitudinally spaced pairs of laterally opposed hand holds immediately below said side rails.

10. A segmented litter comprising a plurality of individual segments having a predetermined ordered adjacent relation when assembled; interfitting means carried by each of the individual segments to provide a releasable, rigid connection between respectively adjacent segments thereby to permit assembly into an integral unit, each of the segments having a floor and laterally opposed side walls upwardly integrally extended from its respective floor, one of said segments being provided with a forward wall integrally upwardly extended from its respective floor and joining the side walls thereby to constitute a prow segment; a shielding hood rearwardly extended from the forward wall of said prow segment to provide a closed forward end therefor; the proportions of the prow segment relative to the remainder of said segments being such to permit reception of the remainder of said segments within said prow segment in a nested relationship; and harness means secured to the prow segment to permit portage in a position with the longitudinal axis thereof substantially vertically oriented and said forward wall facing downwardly.

11. The litter of claim 10 wherein each of said individual segments is provided with laterally spaced, longitudinally extended ground engaging runners integral with the respective floor thereof and projecting downwardly therefrom to adapt the unit for ground traversing movement, and wherein said interfitting means are incorporated into the runners of adjacent segments, the runners of one such adjacent segment having projecting portions extending longitudinally from its runners, and the runners of its respectively adjacent segment having sockets of a configuration complementary to said projecting portions.

12. The litter of claim 11 wherein said runners are formed with internal, closed buoyancy chambers of a size relative to the density and displacement of the litter to render it buoyant as an assembled unit.

References Cited in the file of this patent
UNITED STATES PATENTS

| | | |
|---|---|---|
| 2,410,181 | Peters | Oct. 29, 1946 |
| 2,647,594 | Lutzelschwab | Aug. 4, 1953 |
| 2,770,465 | Dandurand | Nov. 13, 1956 |
| 3,088,128 | Waddington | May 7, 1963 |